Dec. 3, 1929. H. O. CARLETON 1,738,095
PHOTOGRAPHIC FILM PRINTER
Filed May 29, 1925 12 Sheets-Sheet 1

Inventor
Herbert O. Carleton
by Roberts, Roberts & Cushman
Att'ys

Dec. 3, 1929.   H. O. CARLETON   1,738,095
PHOTOGRAPHIC FILM PRINTER
Filed May 29, 1925   12 Sheets-Sheet 2

Inventor
Herbert O. Carleton
by Roberts, Roberts & Cushman
Att'ys

Dec. 3, 1929.	H. O. CARLETON	1,738,095
PHOTOGRAPHIC FILM PRINTER
Filed May 29, 1925	12 Sheets-Sheet 3

Inventor
Herbert O. Carleton
by Roberts, Roberts & Cushman
Att'ys

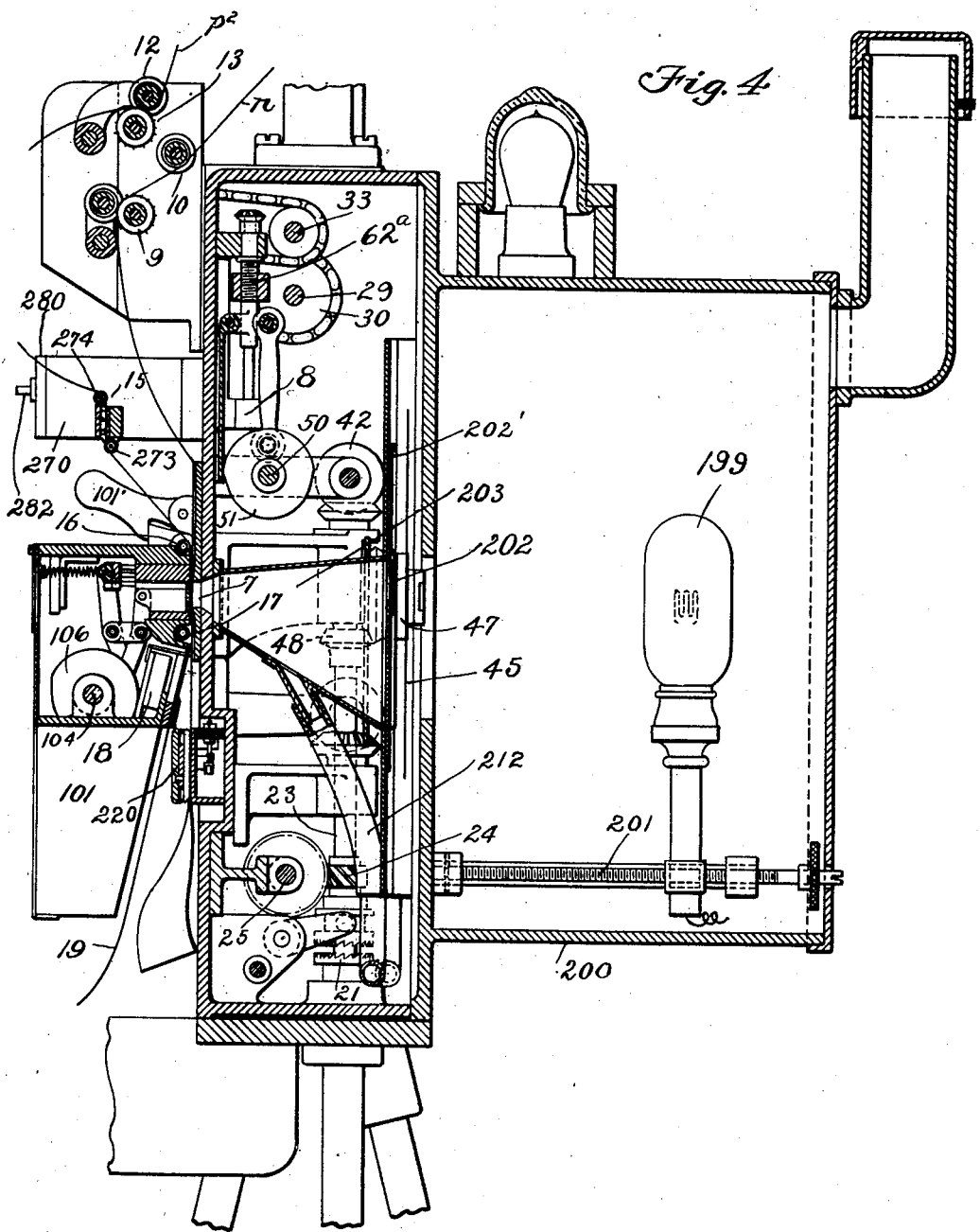

Dec. 3, 1929.   H. O. CARLETON   1,738,095
PHOTOGRAPHIC FILM PRINTER
Filed May 29, 1925   12 Sheets-Sheet 5
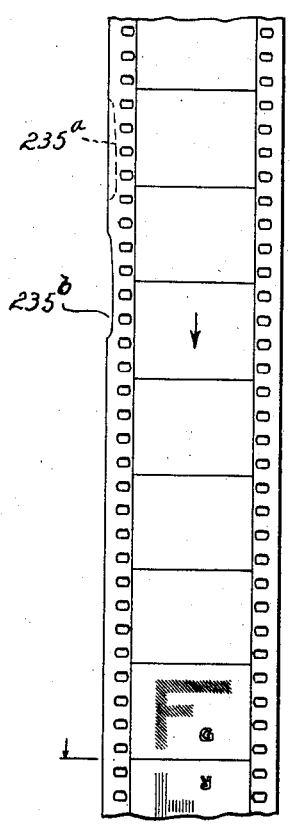
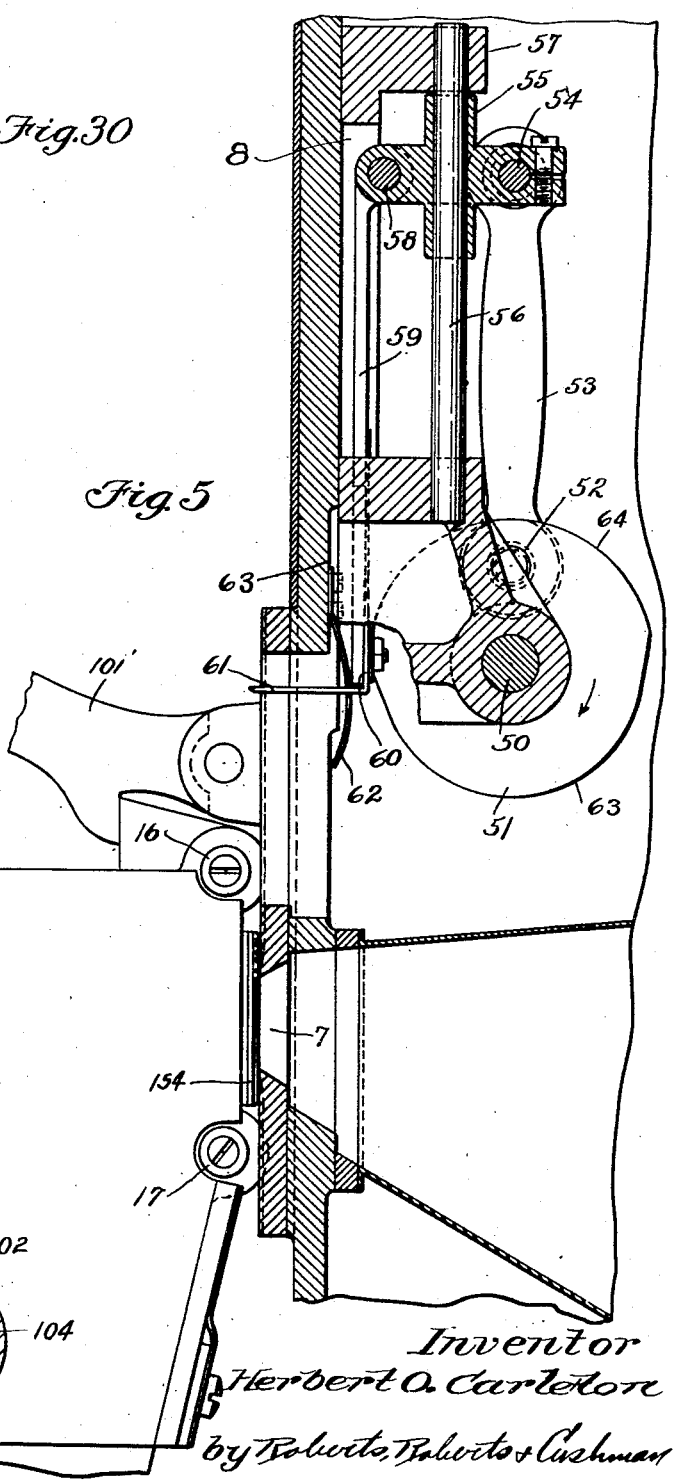

Dec. 3, 1929.                H. O. CARLETON                1,738,095
                         PHOTOGRAPHIC FILM PRINTER
                         Filed May 29, 1925        12 Sheets-Sheet 6
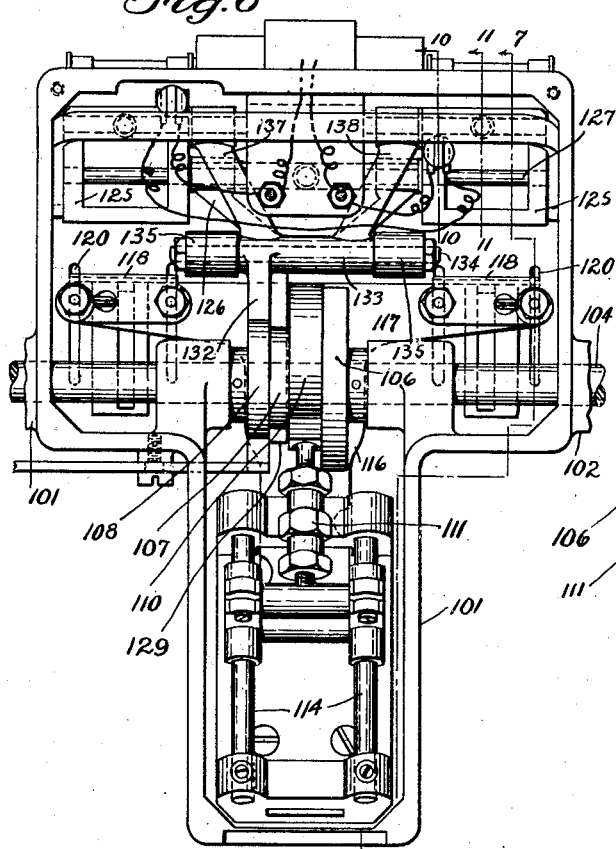
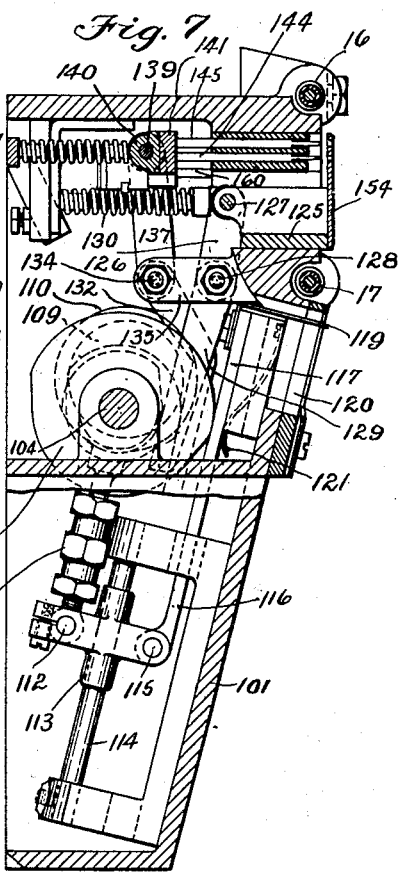
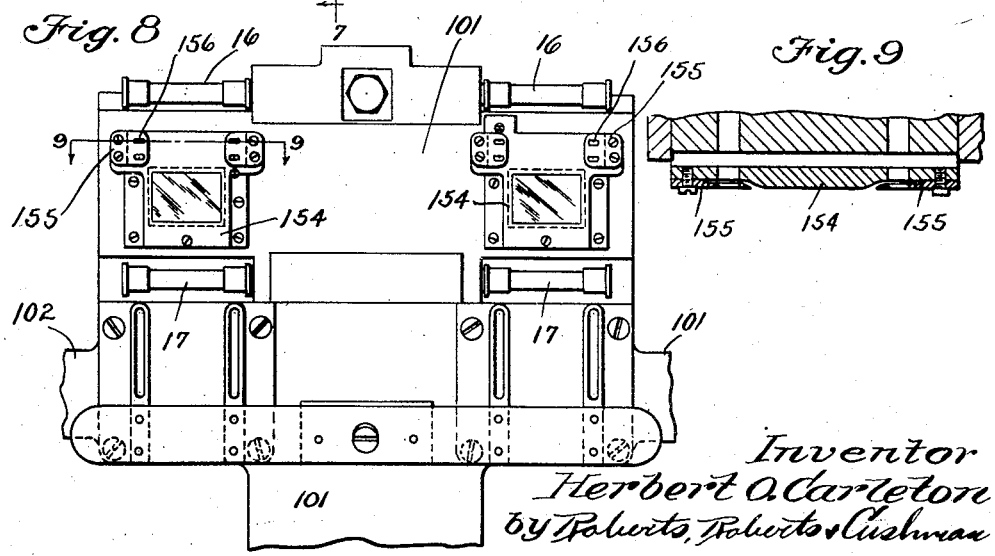
Inventor
Herbert O. Carleton
by Roberts, Roberts & Cushman
Att'ys Dec. 3, 1929.  H. O. CARLETON  1,738,095
PHOTOGRAPHIC FILM PRINTER
Filed May 29, 1925  12 Sheets-Sheet 7
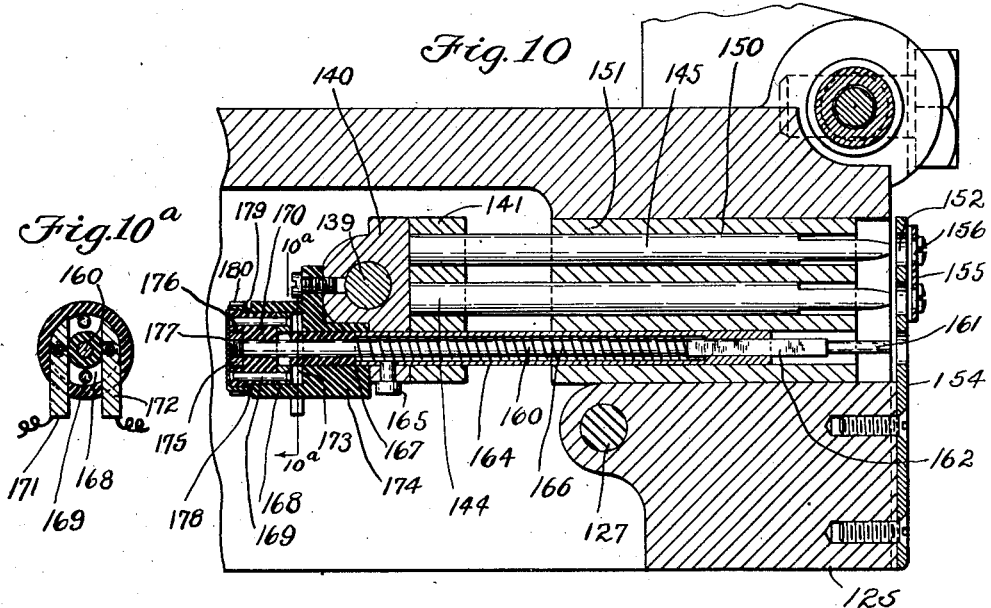
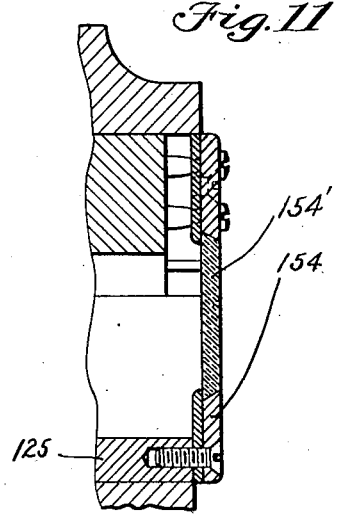
Inventor
Herbert O. Carleton
by Roberts, Roberts & Cushman
Att'ys

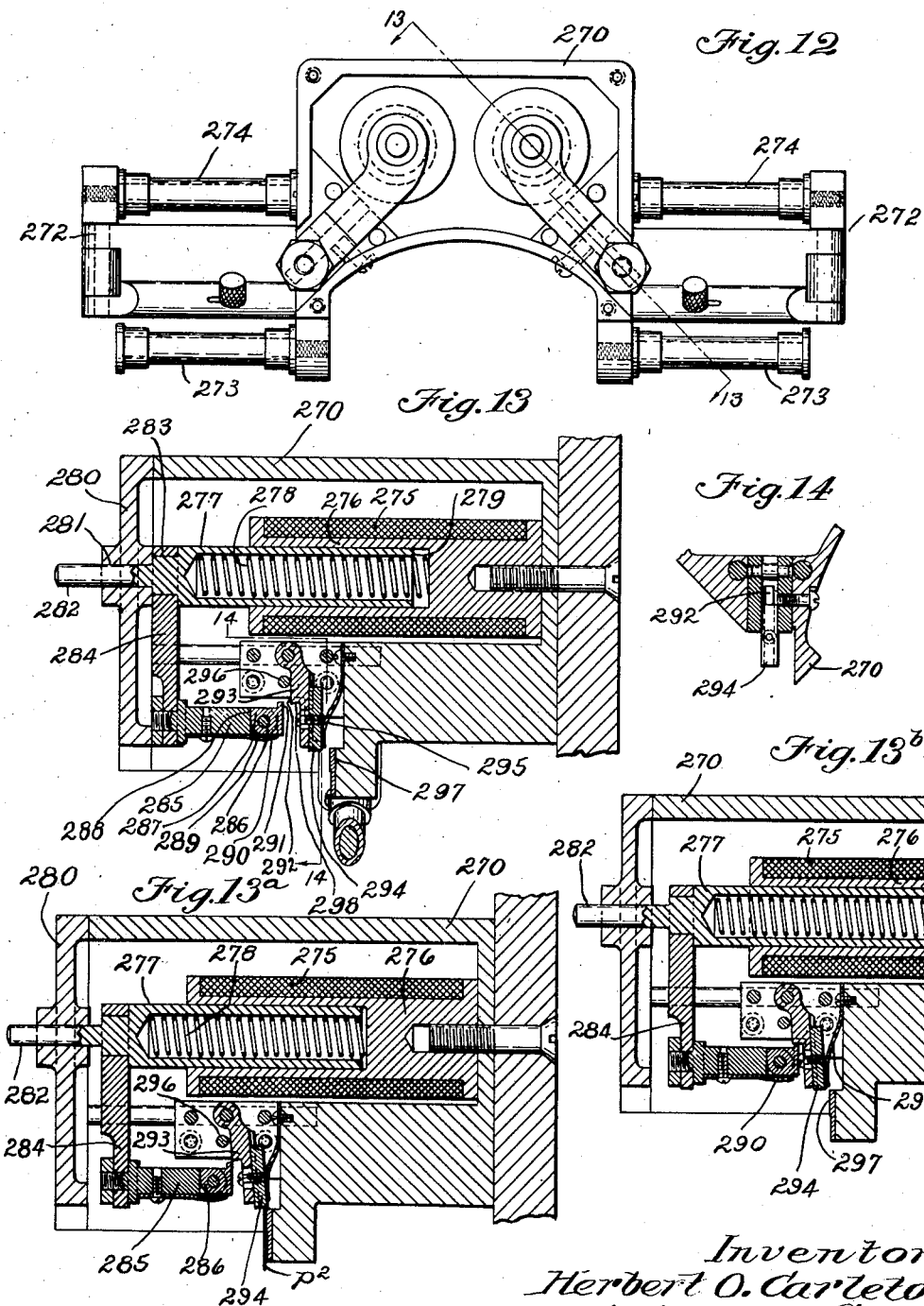

Dec. 3, 1929. H. O. CARLETON 1,738,095
PHOTOGRAPHIC FILM PRINTER
Filed May 29, 1925 12 Sheets-Sheet 9
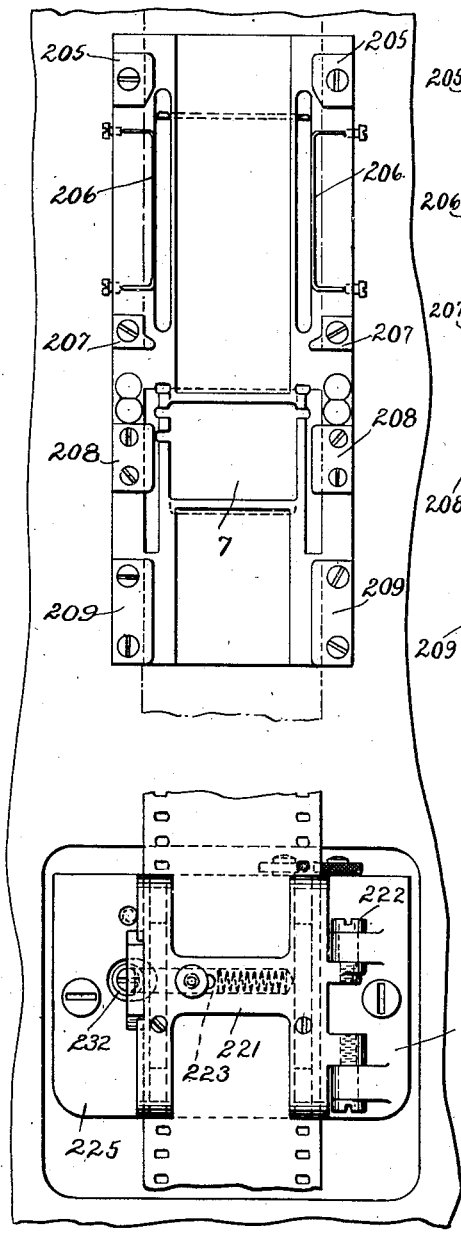
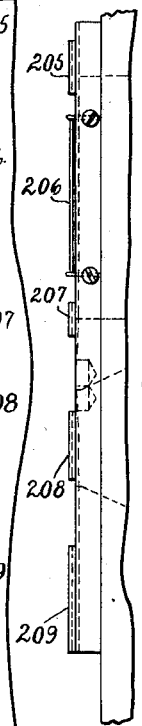
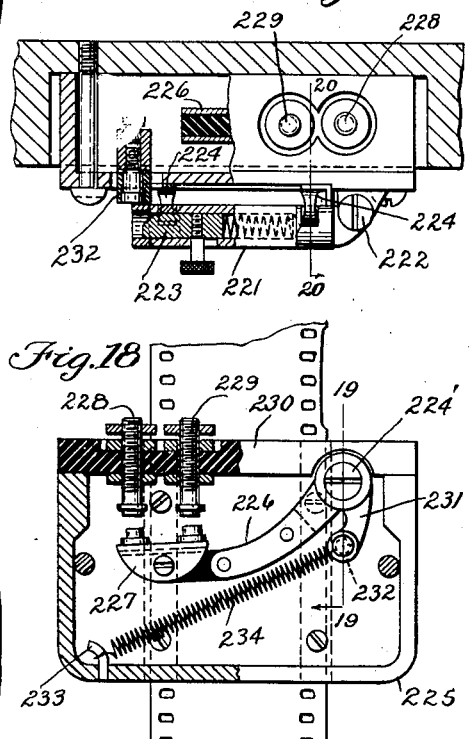
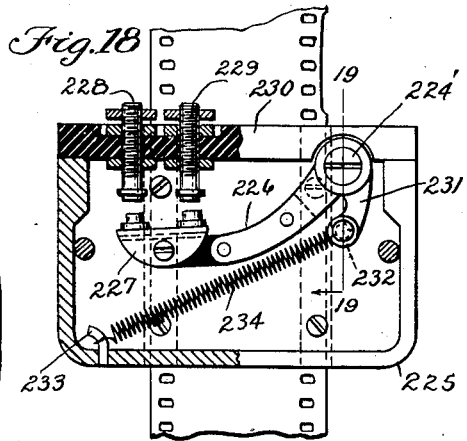
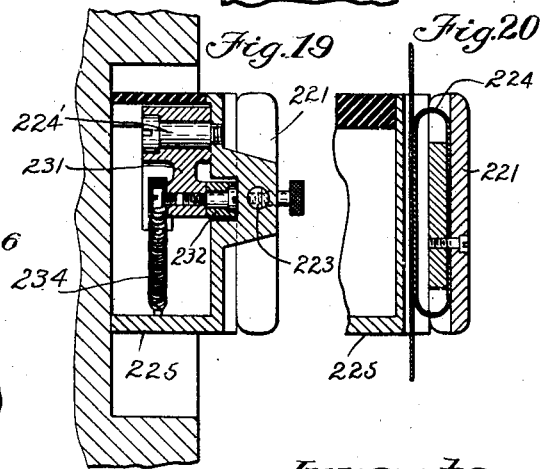
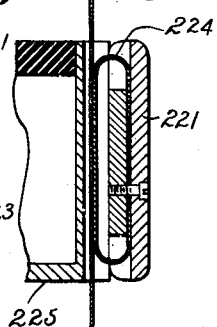
Inventor
Herbert O. Carleton
by Roberts, Roberts & Cushman,
Att'ys Dec. 3, 1929.   H. O. CARLETON   1,738,095
PHOTOGRAPHIC FILM PRINTER
Filed May 29, 1925   12 Sheets-Sheet 10

Inventor
Herbert O. Carleton
by Roberts, Roberts & Cushman
Att'ys

Dec. 3, 1929.  H. O. CARLETON  1,738,095
PHOTOGRAPHIC FILM PRINTER
Filed May 29, 1925   12 Sheets-Sheet 11
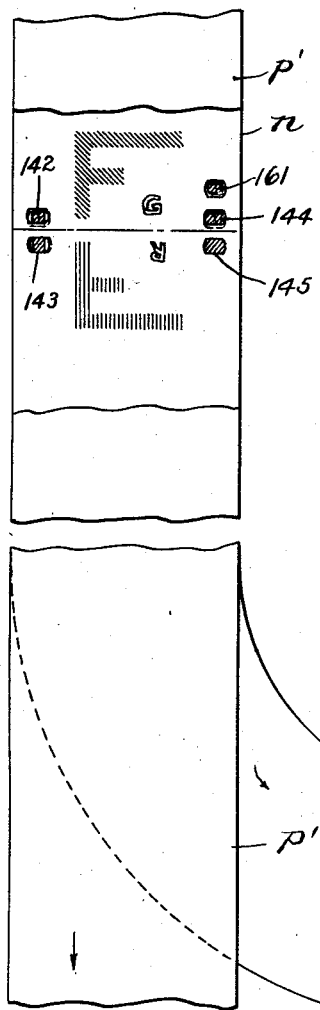
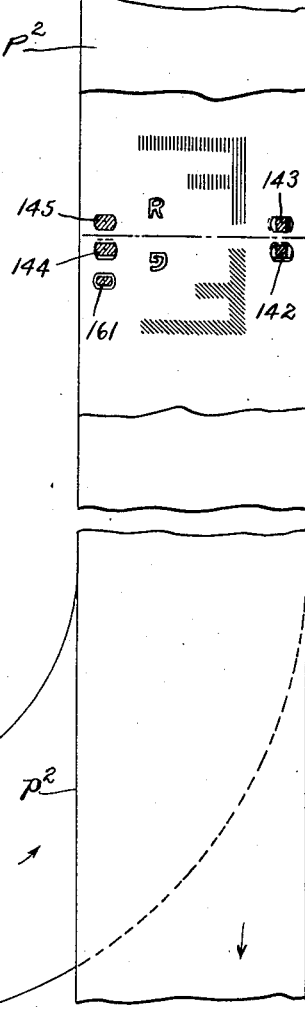
Fig. 22
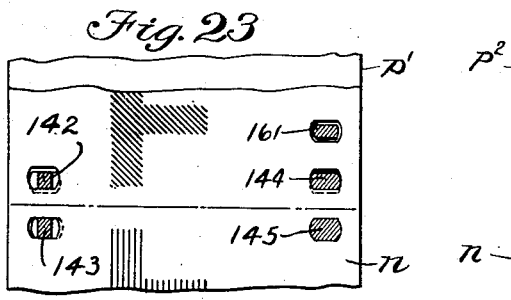
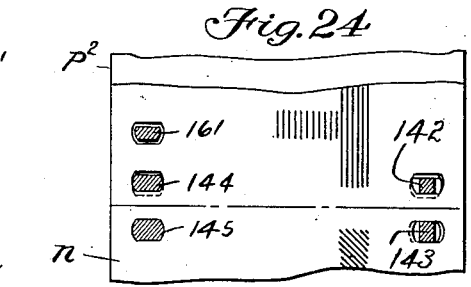
Fig. 23   Fig. 24
Inventor
Herbert O. Carleton
by Roberts, Roberts & Cushman
Att'ys Dec. 3, 1929.  H. O. CARLETON  1,738,095
PHOTOGRAPHIC FILM PRINTER
Filed May 29, 1925   12 Sheets-Sheet 12
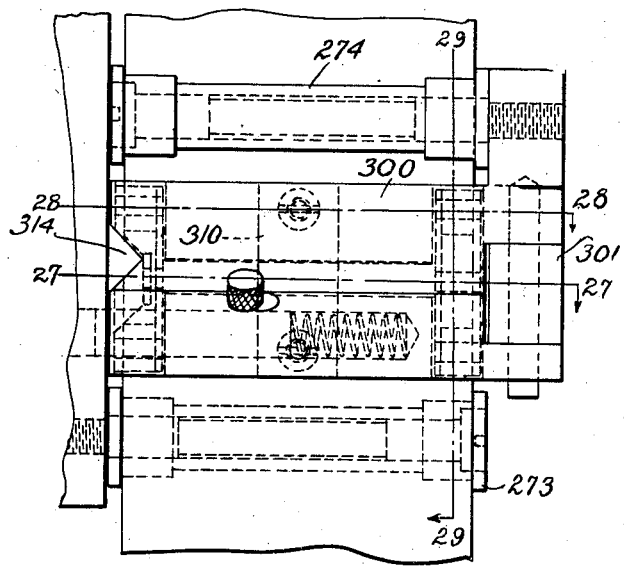
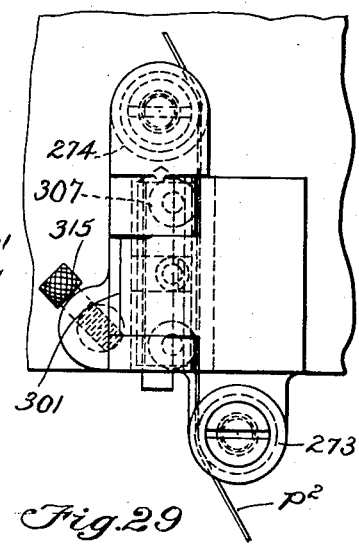
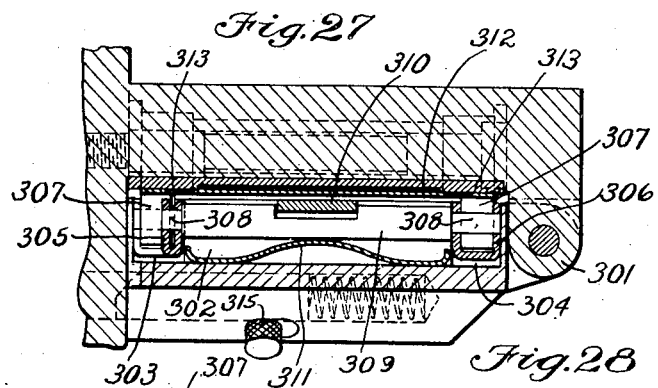
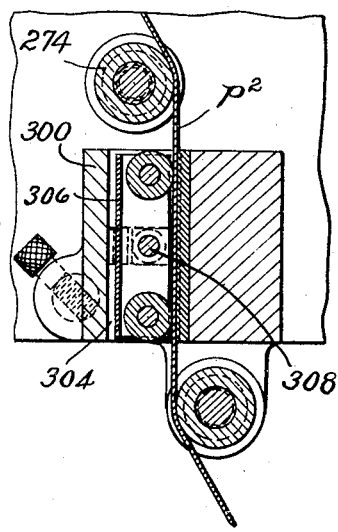
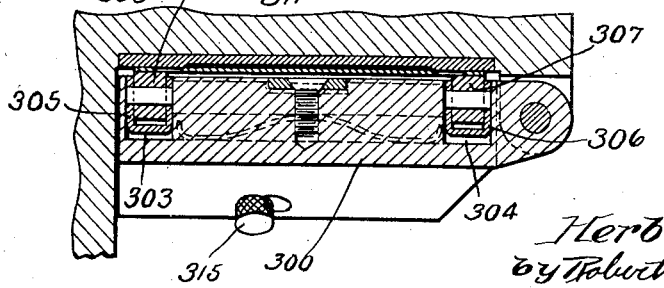
Inventor
Herbert O. Carleton
by Roberts, Roberts & Cushman
Att'ys Patented Dec. 3, 1929

1,738,095

UNITED STATES PATENT OFFICE

HERBERT O. CARLETON, OF BROOKLYN, NEW YORK, ASSIGNOR, BY MESNE ASSIGNMENTS, TO TECHNICOLOR MOTION PICTURE CORPORATION. OF BOSTON, MASSACHUSETTS, A CORPORATION OF MAINE

PHOTOGRAPHIC-FILM PRINTER

Application filed May 29, 1925. Serial No. 33,673.

This invention relates to the production of complemental cinematographic film strips respectively bearing series of images representing different color aspects of an object field and more particularly to the production of complemental positive films which may be used as imbibition matrices or when suitably colored and placed in superposed registry will reproduce the object field with substantial accuracy in natural colors.

Among the objects of the invention are the production of such films rapidly and economically, the exposure of the respective films concomitantly, the printing of positive film strips moving in parallel paths from a single negative strip traveling in a path having portions parallel to the parallel paths of said separate positive films, the provision of improved feeding mechanism, the marking of the positive film strips automatically in a manner to facilitate matching them for imbibition printing or cementing together, and the control through common switch boxes of the marking mentioned and of the changes in printing light. Further objects of the invention are to provide means for advancing the positive films in synchronism, to provide means for advancing the negative film at a plurality of spaced points at twice the rate of the positive films and in the direction of advance of the positive film at one of said points and in an opposite direction at the other of said points. Still further objects of the invention are to provide an improved mounting for a portion of the feeding and registering mechanism enabling ready threading of the film strips and access to the parts, and to provide a very compact arrangement for separately feeding film strips in which feeding means cooperate with the strips at points in their paths of travel at which the strips are relatively close together and make relatively small angles with each other.

The invention is well adapted for the printing of complemental positive film strips from a negative film strip of the character disclosed in the patent to Comstock, 1,457,500, June 5, 1923. Such a strip bears two series of images, the images of the respective series being complemental to each other and arranged in alternation longitudinally of the film, and the images of one series being reversed with respect to the images of the other series.

In one aspect the invention comprises feeding a plurality of positive films along parallel laterally offset paths and printing simultaneously respectively thereon images from the complemental series of a negative film of the type mentioned. In a preferred form of the invention the positive films are fed in the same directions and the negative film is caused to traverse a path so related to the paths of the positive films that the images printed on the latter have their tops extending in the same direction. Preferably, also, the printing may be done in a zone of a single image width extending transversely of the parallel path of positive film travel. The positive and negative film strip feeding mechanisms are preferably arranged at opposite sides of the plane of film strip travel during printing, and one of the feeding mechanisms is preferably mounted for bodily movement relatively to the other, as is also a portion of the film gate and of the registering means, to facilitate threading the film strips and access to the parts.

In another aspect the invention comprises marking a pair of complemental positive film strips, preferably by means forming therein, outside the image bearing areas thereof, notches or like indicia which may serve as guides and checks in the process of matching the positive strips together or to an imbibition blank, whereby proper superposition of the positive images may be assured. In a preferred form these indicia are provided both at the beginning and at the end of the positive strips and are different at the opposite ends, as, for example, a single edge notch being made in the strips at their beginnings and pairs of notches being made at their ends. The making of these notches is preferably controlled automatically by means moving with the negative strip and with the negative strip traversing a path of the character mentioned the notching of the positive films takes place at different instants.

In a preferred form the control of the notching mechanism is by circuit controlling means governed by notches formed on the negative film strip, and this same circuit controlling means may also be used to control printing light varying mechanism by employing separate notches bearing different relations to the images on the negative strip and supplemental circuit controlling means to determine which of said mechanism shall be operated.

In order to illustrate the nature of the invention one concrete embodiment has been shown in the accompanying drawings in which:

Fig. 4 is a sectional view taken generally on the line 4—4 of Fig. 3;

Fig. 5 is a sectional view on an enlarged scale on the line 5—5 of Fig. 3;

Fig. 6 is an elevational view with the cover plate removed of a portion of one of the positive feeding and registering mechanisms;

Fig. 7 is a sectional view on the line 7—7 of Fig. 6;

Fig. 8 is an elevation of the casing housing the positive feeding and registering mechanisms;

Fig. 9 is a fragmentary section on the line 9—9 of Fig. 8;

Fig. 10 is a section on an enlarged scale taken on the line 10—10 of Fig. 6;

Figure 21:
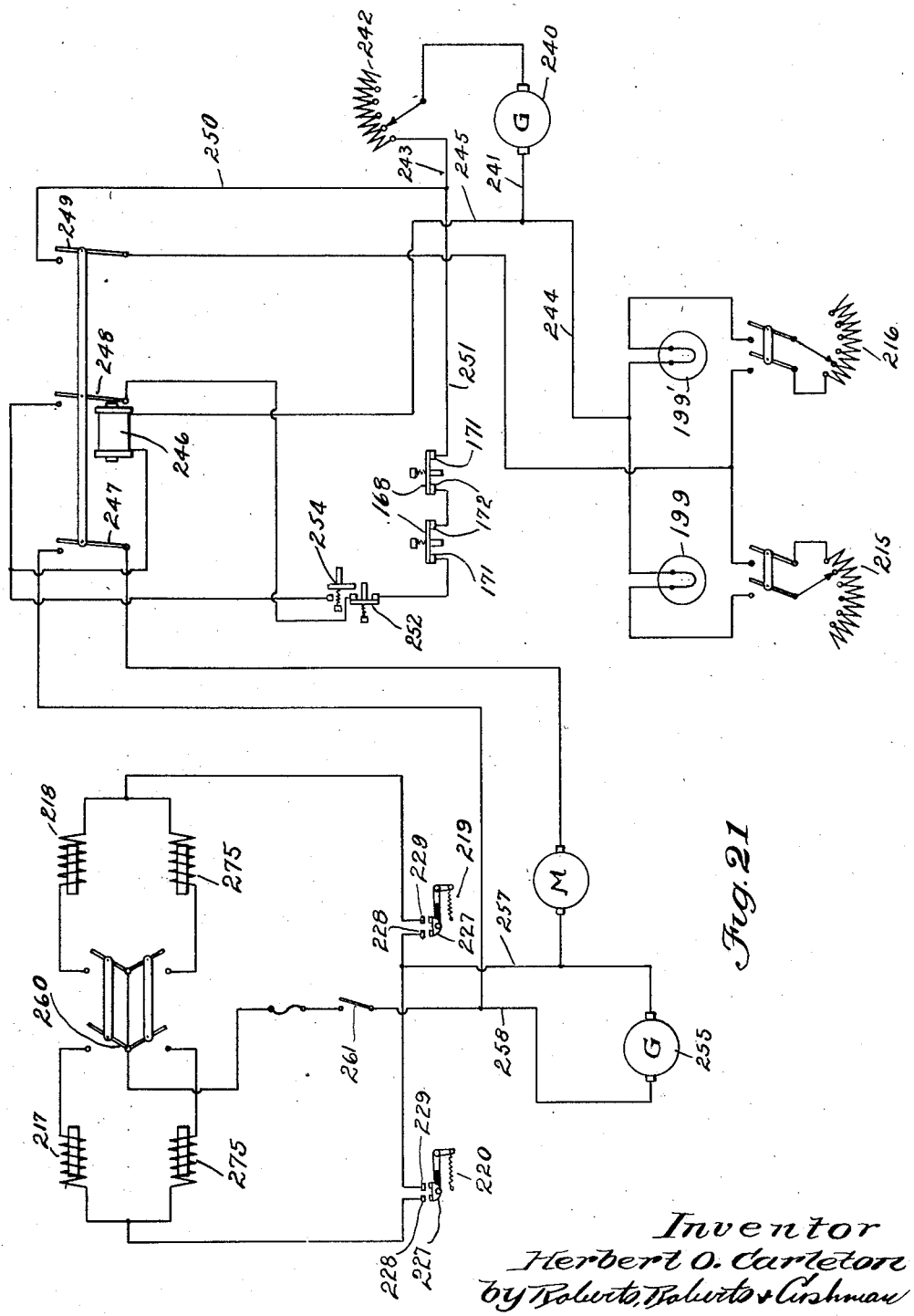

Fig. 10$^a$ is a detail section on the line 10$^a$—10$^a$ of Fig. 10;

Fig. 11 is a section on the line 11—11 of Fig. 6;

Fig. 12 is a front view on an enlarged scale of the film marking or notching mechanism;

Figs. 13, 13$^a$ and 13$^b$ are sections on the line 13—13 of Fig. 12 showing the parts in different positions;

Fig. 14 is a section on the line 14—14 of Fig. 13;

Fig. 15 is a fragmentary front view of a portion of the front of the machine with parts omitted showing the negative guiding means and a light window;

Fig. 16 is a side elevation of a portion of the disclosure of Fig. 15;

Figs. 17 to 20 are views showing details of construction of a film controlled switch mechanism, Fig. 17 being a view partly in plan and partly in section of such a mechanism, Fig. 18 being a rear view with parts broken away of portions of the same mechanism, Fig. 19 is a section on the line 19—19 of Fig. 18, and Fig. 20 a section on the line 20—20 of Fig. 17;

Fig. 21 is a diagrammatic view of certain control and power circuits;

Fig. 22 is a diagrammatic view of portions of the paths of film strip travel;

Fig. 23 is a fragmentary view of a portion of the film similar to that on the left of Fig. 22 on an enlarged scale;

Fig. 24 is a view showing a modified arrangement which may be substituted at the right side of Fig. 23;

Fig. 25 is a front elevation of a film guiding and tensioning means;

Fig. 26 is an end view thereof;

Figs. 27, 28 and 29 are respectively sectional views on the section lines 27—27, 28—28, and 29—29 of Fig. 25; and Fig. 30 is a view of the negative film strip.

Figure 1:
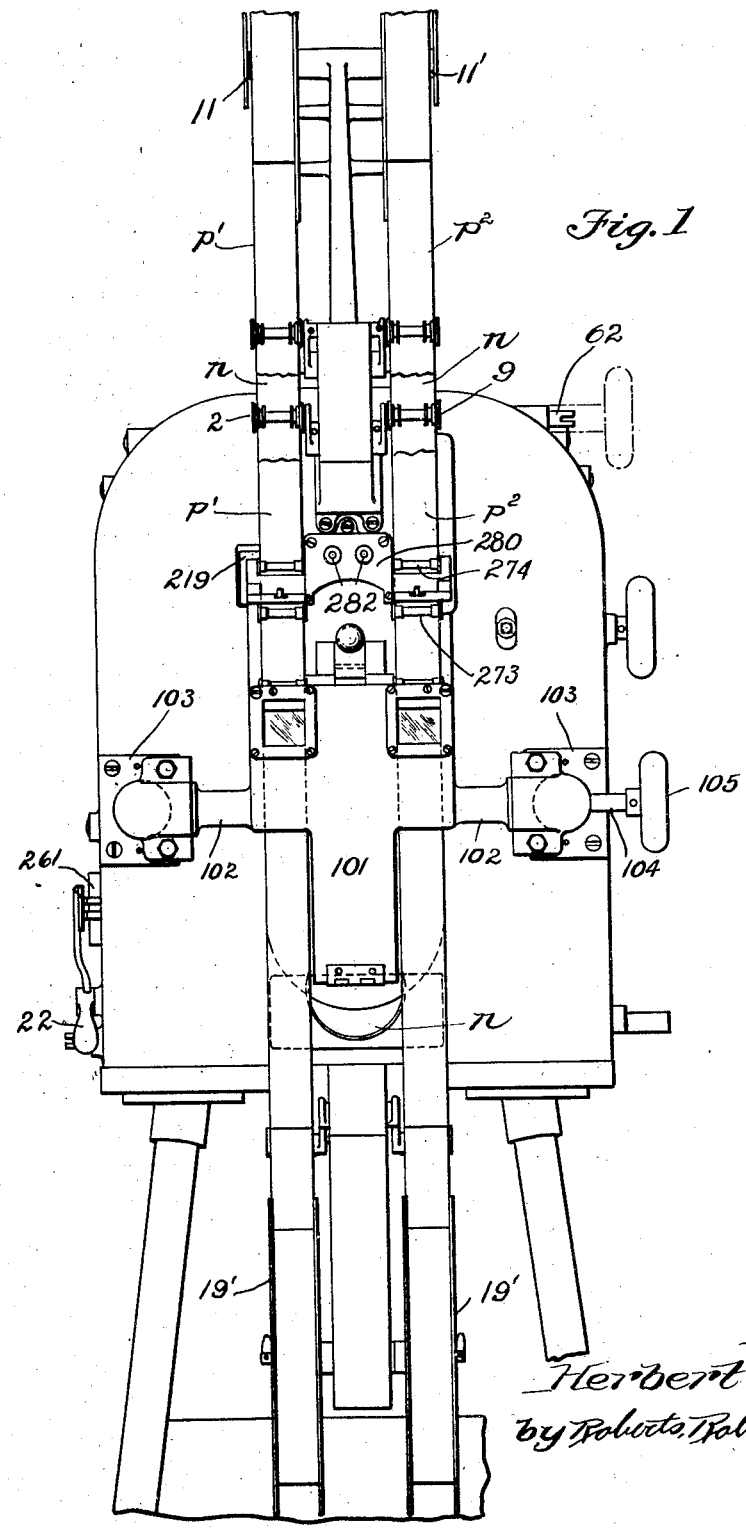
Fig. 1 is a front elevation of the principal parts of a printer embodying the invention with certain parts broken away and omitted.

The particular embodiment of the invention chosen for the purpose of illustration is adapted to print from one negative $n$ simultaneously upon separate positives $p^1$ and $p^2$, the negative bearing two series of complemental images, one series being printed on positive film $p^1$, and the other series being printed on positive film $p^2$. The negative film $n$ is fed from a suitable feed reel (not shown) downwardly through suitable constant speed feeding mechanism 2, (Fig. 1), through suitable film guiding and film controlled switch means, a fragment of which is shown at 219 in Fig. 1, past a light window 3 (Fig. 3), thence downwardly under the intermittent action of feeding means 4 (Fig. 3) for advancing the same step by step, thence downwardly, transversely, and then upwardly in a loop though a film guide and switch means 220 corresponding to the similar means previously mentioned, (Figs. 4, 15, etc.) and past a light window 7, being intermittently fed by a positive step by step feeding mechanism 8 (Fig. 4), thence upward over a continuously rotating feed sprocket 9 (Fig. 1), beneath a guide roll 10 and on to a reel 1. The positive films are fed from parallel reels 11, and 11′ by means of substantially identical feeding mechanisms including guide rolls 12 and positively driven feed sprockets 13, through film marking or notching and tensioning mechanism 15 over rolls 16 and 17, between which they pass the light windows 3 and 7 and are registered and otherwise controlled as hereinafter described, and are then engaged by positive step by step feeding mechanism 18 and led off as at 19 to be wound up upon suitable receiving reels 19′.

Figure 3:
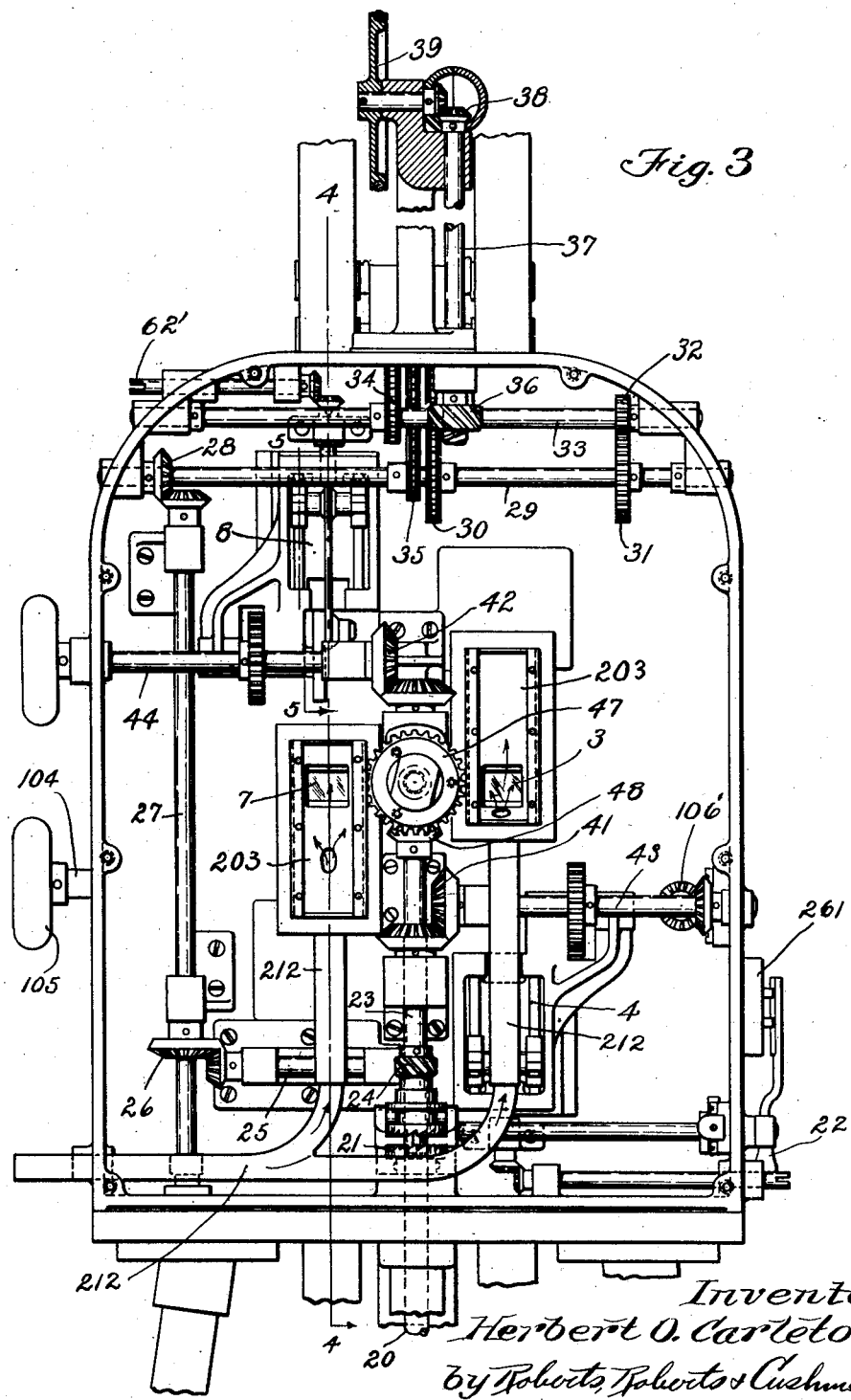
Fig. 3 is a view from the rear with a cover plate and certain other parts removed to show the driving mechanism.

Referring to Fig. 3, 20 indicates a motor driven power shaft connected through a toothed clutch 21, controlled by mechanism 22, with a vertical shaft 23. The latter drives, through helical gearing 24, a horizontal shaft 25 which is connected by bevel gearing 26 with a vertical shaft 27 which in turn drives through bevel gearing 28, a horizontal shaft 29 carrying a negative feed drive sprocket 30, operatively connected with the continuous negative feed mechanism 2, and a gear 31, driving a smaller gear 32 upon a parallel shaft 33. Upon the shaft 33 a driving sprocket 34 is arranged for effecting drive of the second negative continuous feeding mechanism 9, the size of this sprocket being so proportioned to the size of the sprocket 30 that the negative feeds are effected at equal rates though in opposite directions due to the opposite rotations of the shafts 29 and 33. A sprocket 35 upon the shaft 29 serves as a drive for both positive film feeding mechanisms, whose sprockets 13 are mounted on a common shaft. Helical gearing 36 connects the shaft 33 with a vertical shaft 37, which, through bevel gearing 38, drives the pulley 39 which by a belt 40 is connected to and drives the negative receiving reel 1. The shaft 23 also drives through suitable bevel gearing 41 and 42, horizontal shafts 43 and 44 which drive the step by step negative feeding devices 4 and 8. A shutter 45 carried coaxially with a gear 47 is driven by a bevel pinion 48 upon the shaft 23 between the gearing 41 and 42. The shaft 43 also drives the intermittent positive feed in a manner hereinafter described.

Fig. 5 illustrates the means for effecting the intermittent upward feed of the returning portion of the negative film, which mechanism is, except for its inverted position, substantially the same as the mechanism for effecting the downward feed of the other portion of the negative film. This mechanism comprises a shaft 50 driven through suitable gearing from the shaft 44 and carrying thereon a cam 51 which also constitutes a crank disk and carries a crank pin 52 connected by the connecting rod 53 to a wrist pin 54 upon a vertically reciprocable cross head 55 slidable upon guides 56 supported at their opposite ends in a vertically adjustable frame 57. At the other side of the guides 56, the cross head 55 carries a pin 58 to which is pivotally connected an arm 59 which at its lower end carries a plate 60 having projecting fingers 61 adapted to enter the sprocket holes in the negative film n. A spring 62 mounted upon a portion 63 of the wall of the printer casing constantly tends to force the arm 59 into a position in which the pins 61 will be withdrawn from engagement with the negative film. The cam 51 has surfaces 63 and 64, the former spaced a substantially less distance radially from the periphery of the shaft 50 than the latter, and these surfaces cooperate with the arm 59 to permit retraction of the pins 61 from engagement with the film during their downward movement, to cause them to enter the film sprocket holes when in bottom position and to retain such engagement until top position is reached, and then to permit release of the pins from the sprocket holes. The travel of the pins 61 is such that the negative film n is moved two image spaces for each complete reciprocation of the pins. It is to be observed that the pins 61 when at the lower ends of their travel are very near the light window 7 and at the upper limit of their path are only spaced a few picture spaces from the window. As a result possible shrinkage of the negative n can not interfere with the feed or registration of the strip, because the distance between the window 7, closely adjacent to which is the registering means shortly to be described and either end of the path of the pins 61 is so short that abnormal shrinkage would be essential before trouble would result. By raising or lowering the frame 57 the path of the pins may be adjusted as desired, suitable screw and nut adjusting means 62$^a$ (in Fig. 4) controlled by a shaft 62' being provided for this purpose. Corresponding adjusting mechanism is provided for the mechanism 4.

For the purpose of feeding the positive films intermittently and registering the positive and negative strips the following mechanism is provided.

Figure 2:
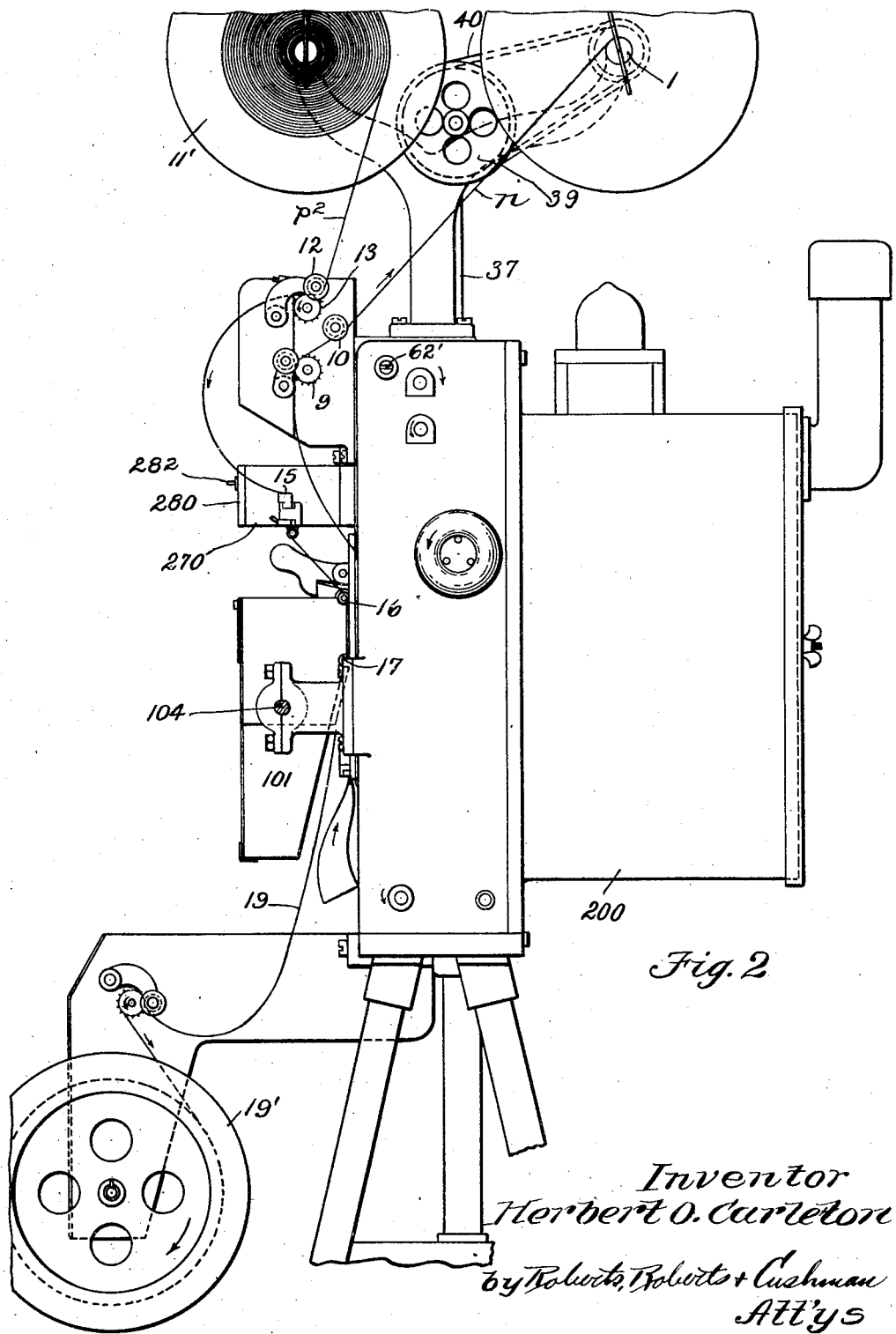
Fig. 2 is a side elevation of the printer.

Pivotally supported upon the front of the printer casing is a housing 101, said housing being provided with trunnions 102 whereby it is journalled in brackets 103 upon the front of the casing. Manually releasable latch means 101' normally holds the housing 101 in the position shown in Figs. 2, 4 and 5, but is releasable to permit the housing to tilt outwardly to facilitate threading the film strips. Through the trunnions and transversely of the housing extends a shaft 104, which is manually operable by a hand wheel 105, but which is normally driven by gearing including the bevel gearing 106' actuated by the shaft 43. The positive films are advanced simultaneously by identical mechanisms, arranged adjacent the opposite sides of the casing 101, and advancing the films a single image space at a time. Mechanism for registering the films when advanced, mechanism for pressing the films into engagement with the negative film strip, and mechanism for actuating the several mechanisms mentioned are all carried by the housing 101. Referring more particularly to Figs. 6 and 7, it will be observed that the shaft 104 carries thereon a series of cams 106, 107 and 108, and also an eccentric 109 which is connected by a strap 110 and adjustable connecting rod 111 with a pin 112 upon a cross head 113 slidable upon guides 114. The cross head 113 carries a pin 115 to which is connected a T-shaped member 116 whose head 117 carries plates 118 having fingers 119 adapted to extend through slots 120 in a wall of the housing 101 and to engage in the sprocket holes of the positive films to advance the latter. A spring 121 acts to impart a pressure upon the arm 116 to force the pins backwards out of the sprocket holes when the position of the cam 106 permits. The cam 106 cooperates with the member 116 in the same manner as the cam 51 with the arm 59.

For the purpose of pressing the positive films into contact with the negative at the moment of printing, as later more fully described, slides 125 (see particularly Figs. 7 to 11 inclusive) respectively cooperating with the positive films are adapted to be actuated by the arms of a Y-shaped lever 126 pivotally connected thereto at 127, and pivoting about a pin 128 stationary as regards the housing 101, the lower end 129 of the lever 126 being engageable with the cam 107 to effect a positive retraction of the member 125, while a spring 130 constantly acts to force the same forward as soon as such movement is permitted by the change in the position of the cam 107.

Suitable film registering means actuated by the cam 108 upon the shaft 104 is also provided. The cam 108 engages an arm 132 which terminates in a sleeve 133 journalled for rocking motion upon a pin 134 supported in projecting arms 135 carried by the casing 101 and also supporting the pin 128. Sleeve 133 carries spaced diverging arms 137 and 138 which at their outer ends are pivotally connected to pins 139 mounted in members 140 which form portions of supporting means for series of registering pins and for automatically operative stop pin mechanism. One set of these, namely those cooperating with the right hand positive film strip $p^2$ in Fig. 22 will be described and then the differences between the two sets may be noted. Supported in a member 141 secured to the member 140 is a set of pins 142, 143, 144 and 145. The pins 142 and 143 are arranged at one side of the path of travel of the positive film strip and opposite the sprocket holes therein. The pins 144 and 145 are arranged at the opposite side of the path of travel of the same film strip and opposite the other series of sprocket holes therein. The four pins are for a distance from their ends tapered symmetrically with respect to their axes so that their extremities may enter perfectly positioned sprocket holes in a new film at equal distances from the top and bottom edges of the sprocket holes, and at equal distances from the lateral edges of the sprocket holes. The pin 145 at the large end of its tapered portion is of the full size of a standard sprocket hole and fits such a sprocket hole exactly in each direction. The pin 144 fits a standard sprocket hole accurately transversely, but at a certain distance from its end at the side of the pin remote from the pin 145 the taper merges into a cut away portion so that it is of less thickness than the length of a standard sprocket hole, whereby longitudinal shrinkage of a film strip may be accommodated. The pin 143 is cut away at two sides so that lateral shrinkage may be accommodated, but the pin is of the full thickness in its other dimension so that it fills a standard sprocket hole in the longitudinal direction of the film. The pin 142 is cut away along three sides so that it provides not only for lateral shrinkage, as was the case with pin 143, but also for longitudinal shrinkage, as in the case of pin 144. These four pins are simultaneously advanced by the lever mechanism including the arm 138 previously described. The pins slide in bores 150 in a block 151 and are adapted to be projected through a series of openings 152 in a plate 154 carried upon the slide 125. Mounted upon the face of this plate are guide plates 155 which are perforated as indicated at 156 to permit the pins 142, 143, 144, and 145 to pass through them, these plates 155 having their outer surfaces flush with the outer surface of the plate 154, (see Fig. 9) and serving to retain the positive film in position against the plate 154 and to separate the lateral edges of the positive film from the negative film during the process of registration, whereby the positive film, which in the case of films intended to be connected back to back is quite thin, cannot be forced through the openings in the negative film and caused to interengage therewith with resultant tearing and other difficulties.

Also carried by the members 140 and 141 is part of an automatic stop mechanism which comprises a pin 160 having an extremity 161 slightly smaller in each direction than a standard sprocket hole and adapted in case the films are so far out of registration as to preclude their proper registration without tearing, to engage the films and thereby, through mechanism to be hereafter described, to effect an interruption in the operation of the entire machine. The pin 160 is provided with a rectangular portion 162 slidable in a correspondingly shaped recess in a tubular member 164 which is held against rotation by a pin 165 in the member 140. To the rear of its rectangular portion the pin 160 is circular and is surrounded by a spring 166 which operates against a shoulder 167 normally to maintain the pin 161 protruded to an extent such that its extremity lies in the same plane as the extremities of the pins 142 to 145. When the pin 160 occupies this position a disk of conducting material 168 connected by rivets 169 to a sleeve of insulating material 170 contacts with a pair of contact elements 171 and 172, projecting into a recess 173 in a member 174 formed of insulating material and secured to the member 140. To preclude the movement of the pin 160 in a direction opposite the movement of the pins 142 to 145 as the latter are advanced without breaking a circuit including the elements 171 and 172, the pin 160 is provided at its rear end with a nut 175 received in a recess 176 in the insulating element 170 and held in position therein by a member 177 of sheet metal having an edge 178 adapted to underlie a shoulder 179 upon the sleeve 170 and to be held in position in a notch 180. There is sufficient play around the rear end of the pin 160 and nut 175 to permit the necessary tilting of the contact annulus 168 to insure the making of a circuit when the pin 161 is in forward position, but this free play is insufficient to permit such lost motion as would enable the circuit to remain closed upon any substantial obstruction to the forward movement of the pin 160. The registering and stop pin mechanism may obviously assume different forms, as for example, that described in Troland Patent No. 1,598,756, granted September 7, 1926, and the particular form disclosed is described and claimed in the Troland application Serial No. 68,833, filed November 13, 1925. It will be observed that in the mechanism cooperating in the registering of the other positive strip with the negative the position of the pins corresponds to that produced by the inversion of the pin mountings and such an arrangement may in fact be used. The full size pin 145, with such an arrangement, enters the same holes in the negative film with which the full size pin of the camera cooperates. As shown in Fig. 24, however, if desired the full size pin could be arranged to enter holes bearing the same relation to the axis of symmetry of the images on the negative film strip, so that the relations of the light windows and the images printed thereat to the full size registering pin will be the same.

Separate printing lights 199, of which but one is shown, are arranged in a light house 200, these lights being adjustable towards or away from the light windows by suitable screw mechanisms 201 and also being vertically adjustable to take care of the effect of shrinkage in the negative film strip. The light from these lamps passes through glassed windows 202 arranged in slides 202' adjustable in the rear of boxes 203 and is controlled by the rotating shutter 45. The boxes 203 are constructed to permit a minimum of air leakage and are supplied with air under low pressure for the purpose of causing good contact between the negative and positive films at the moment of printing. The negative film passes in a suitably guided path (see Figs. 4, 15 and 16) along the front of the main printer casing and across the light windows through which the air pressure passes to bow the central portion of the negative film strip outwardly. Suitable guides 205, 206, 207, 208 and 209 guide the edge of the negative strip and preclude lateral movement thereof during the feeding and printing operations, and these guiding means also serve with guides 155 on the pressure plates to maintain the film strips out of contact during the intermittent advancement thereof, at which time the pressure plates are retracted. When the apparatus is in operation air under pressure is supplied to the chambers or boxes 203 through suitable connection 212. This pressure is just sufficient to bulge the center of the negative film slightly outwardly and hold its lateral edges against the guides 208. When the pressure plates 154 move forwardly to press the positive films into contact with the negative film, contact first occurs at the bulging center of the negative film and the positives then flatten the negative out and contact with the rest of the surface thereof opposite the light windows. The plates 154 comprise small panes 154' of "safety glass" opposite the light windows which act to apply the pressure to the films and prevent damage by the printing light.

It will be observed that the registering pins 142, 143, 144, and 145 and the positive film strip guiding plates 155, and also the automatic stop pins 161 are carried by the housing 101 in positions above the horizontal plane including the axis of the trunnions 102, and that the positive feed fingers 119 also reciprocate in said housing in paths above the same plane. As a result, when the latch mechanism 101' is released and the housing 101 tilted outwardly on the trunnions 102, the positive film strips may be very readily threaded in position and brought into proper relation to the registering pins, etc., and access to the negative film strip guides, etc., is also facilitated.

In order to enable the easy determination of the proper spacial relation necessary between the positive film strips when they are about to be cemented together, and to provide means for properly effecting registration in case the strips are cemented before development, suitable means for marking them, as by forming guide notches in their edges, is provided. Mounted upon the front of the casings and below the continuous feeding mechanism for the positive and negative films but above the light windows there is disposed a notching mechanism whose function it is to notch the positive films at corresponding points at the beginning of the printing run and to notch them also at corresponding points at the end of the printing run in order to provide means whereby an additional check upon the proper registration of the films may be obtained when the films are cemented together. This mechanism 15 comprises a casing 270 secured to the front of the main printer housing and provided at its opposite sides with film guiding and supporting mechanism generally designated 272 (see Figs. 12 to 14). The latter, which are later more fully described, briefly consist of stationarily and movably supported guide rollers 273 and 274, together with mechanism for maintaining the film under tension, not only during the operation of the nicking mechanism, but also to provide for its better cooperation with the positive feeding mechanism. The notching mechanism is made in duplicate in order that the two positive films may be notched, and these are notched at substantially different times, one when one of a pair of complemental images on the negative $n$ reaches a position spaced by a predetermined distance from the light window, and the other when the complemental image of the same pair reaches a corresponding distance from the opposite light window. Each of the notching mechanisms is electrically controlled by circuits and switches which will later be described. Referring, in view of the general identity of detail, to but one of these mechanisms its will be observed that the right hand notching mechanism comprises a solenoid 275 wound upon a hollow sleeve 276 within which a core 277 is reciprocable, the core being normally projected to a maximum distance from the recess within the sleeve by a spring 278, but adapted to be drawn into the sleeve until its inner end 279 engages the bottom of the recess. For the purpose of limiting the outward movement of the core, a cover 280 is secured to the outer end of the casing 270 and this provides passages 281 through which guide pins 282 carried at the extremity of the cores may reciprocate. Surrounding a reduced portion 283 adjacent the outer end of the core 277 is one extremity of an arm 284 which has secured thereto a part of the actuating means for the notching mechanism, including a projecting element 285 having pivotally mounted at the outer end thereof a member 286 provided with a portion 287 adapted to engage a shoulder 288 upon the element 285 to limit rotary movement of said element 286 in a counter-clockwise direction in the view shown in Fig. 13, and, in terms of force acting upon said member, to prevent its yielding under the force exerted upon it in its movement to cause the notching operation. Owing to a cutaway portion 289 the member 286 may swing backward after the manner of a clapper box when its end is subjected to a force tending to swing it in an opposite direction. A spring 290 normally holds the member 286 in the position shown in Fig. 13. The member 286 has a projecting nose 291 adapted to contact with and apply pressure to a shoulder 292 formed upon a swinging arm 293 which carries adjustably mounted thereon a notching cutter 294. A spring 295 normally moves the notching cutter and its supporting member 293 to the position shown in Fig. 13 where engagement takes place between a surface of the member 293 and a stop pin 296. A cooperating stationary cutter 297 is supported upon a stationary part in suitable position for cooperation with the cutter 294. It will be observed that the shoulder 292 is provided with a slight undercut 298. The mode of operation of this portion of the mechanism will be obvious. On energization of the solenoid 275 the core 277 will be drawn to the right in Fig. 13. As indicated in Fig. 13ª the engagement of the nose 292 with the shoulder 291 will cause the movable cutter 294 to cooperate with the stationary cutter 297 in cutting a notch, which may be of any desired shape, but which is herein triangular, from the lateral edge of the film. As the solenoid will not be immediately deenergized it will be evident that it is essential that the movable cutter be withdrawn from the notch before the positive film is next moved, as otherwise tearing would occur. This is automatically accomplished by reason of the fact that due to the separation of their paths the nose 291 slides by the extremity of shoulder 292 at about the instant when cutting is completed and as a result the spring 295 operates to swing the notching cutter back to a position above the line of travel of the film, notwithstanding the fact that the arm 285 has not yet been withdrawn. Accordingly the film is free to be advanced by the feeding mechanism without tearing and on deenergization of the solenoid the spring 278 will act to move the arm 284 in a direction to withdraw the member 286, and the nose will be free to pass the shoulder by reason of the clapper box type mounting which permits the nose to swing backward as it passes over the shoulder.

The positive films are guided and supported as they pass the notching devices by mechanism 272 already briefly described and including the rolls 273 and 274. The rolls 274 are mounted on swinging gate members 300 (see Figs. 25 to 29) which are pivoted on bosses 301. Each of the gate members is provided with H shaped grooves comprising a transverse slot 302 and a pair of slots 303, 304 perpendicular to the transverse slot and adjacent the edges of the gate. Mounted in the last slots are channel elements 305 and 306 which have journaled therein near their opposite ends film engaging rolls 307 and the channel members are pivoted between their ends on reduced portions 308 of a bar 309 which lies in the transverse slot 302. A strip 310 serves to retain the bar 309 and its connected channel elements in the gate. A bowed spring 311, disposed in the slot 302 between the bottom thereof and the bar 309, resiliently forces the bar and with it its attached elements towards a surface 312. This surface is slightly lower than a pair of guide surfaces 313 which are opposite the sprocket hole carrying portions of the film strips and the image bearing portion of the film accordingly does not have a chance to scratch. The gate and the channel element 305 are notched as at 314, to permit the notching cutter to engage the edge of the film strip and the gate may be held closed by a latch mechanism 315. The mechanism specifically disclosed may obviously assume other forms. It will be observed that this mechanism not only holds the positive during notching but provides a tension against which the intermittent feed pulls.

In printing the films are preferably arranged with the light passing through the back of the negative and with the back of the positive towards the negative, i. e. so that printing will occur through the back. The negative $n$ accordingly is turned as it passes from the downwardly extending portion of its path to the upwardly extending portion thereof.

As is customary with printers which operate to print complemental images on separate positive film strips at the same time, the printing lights are varied during the printing operation in accordance with the density of the images. The mechanism used for this purpose includes separate variable resistances of usual construction 215 and 216 respectively arranged in series with the lamps 199 and 199′. These resistances are conventionally shown in Fig. 21, and are provided with separate gravity operated solenoid controlled operating devices of usual construction. The controlling solenoids for the resistances are respectively shown at 217 and 218 and energization of these solenoids effects in a well-known manner a change in the resistance in the light circuits.

For the purpose of controlling these solenoids and the solenoids of the film marking or notching mechanism, common negative film controlled pilot switches are used, suitable manual switches later described being operable to determine whether the notching mechanism or the light control mechanism shall be operated. Separate pilot switch mechanisms 219 and 220 are arranged in the paths of the descending and upwardly moving portions of the negative film at suitable distances ahead of the light windows. As these mechanisms are substantially identical but one needs be described. The position of the mechanism 220, cooperating with the upwardly moving portion of the film strip $n$ is indicated in Fig. 4. The other of these mechanisms is not clearly visible in the drawings but an edge thereof shows in Fig. 1. These mechanisms include gates 221 pivoted as at 222 and having latch mechanisms 223 for holding them closed. The gates are substantially H-shaped in elevation and are provided with guide springs 224 which support the edges of the negative film strip during its cooperation with the control mechanism. Pivotally mounted upon a stud 224′ carried by a box member 225 to which the gate 221 is pivotally connected is a rocking lever mechanism comprising a relatively long arm 226 having at its free end, but insulated therefrom, a bridge member 227 of conducting material adapted to complete a circuit between a pair of stationary contact members 228 and 229 mounted in a wall 230 of insulating material. The rocking lever mechanism also includes a second arm 231 connected in fixed angular relation to the lever 226 and carrying at one end thereof a roller 232 adapted to contact with the edge of the negative film strip and also having connected between it and a pin 233 a very light spring 234 which draws the roller 232 against the edge of the negative film strip.

The negative film strip is provided with a plurality of lateral notches $235^a$ and $235^b$. These notches have relatively steep leading edges, whereby the rollers 232 drop sharply into them to effect quick circuit closures. They have bottoms which are initially substantially parallel to the edge of the film strip, whereby the circuit may remain closed for a substantial time, and they have relatively gently sloping portions leading back to the full width portions of the strip. The notches $235^a$ cooperate with the rollers to effect notching and the notches $235^b$ to effect light changes. The former are so related to the strip that the positive films come to rest by the instant at which the notching mechanism operates. The latter bear such relation that the circuit is closed to effect a shift in the resistance while the films are feeding and while the shutter interrupts the passing of light between the lamps and the light windows. A suitable manual switching arrangement hereinafter described may be placed in different positions to limit the operation caused by the operation of the switch mechanisms 227, 228 and 229, either to the notching or to the light change devices. The distance of the notches $235^a$ and $235^b$ from the axes of symmetry has been pointed out, and although in no ordinary case would the notches be as close as suggested in Fig. 30, the notch $235^a$ is dotted in to bring out this feature more clearly. In this figure the direction of film travel is indicated by the arrow.

The various circuits of the printer are shown in Fig. 21. Direct current is supplied from a suitable source 240 to a line 241 and through an automatic voltage regulator 242 to a line 243. The line 241 branches and one branch 244 leads to connections to one side of the printing lights. The other branch 245 leads to a switch operating magnet 246 which controls simultaneously the three poles 247, 248 and 249 of a three pole switch. The wire 243 branches and one branch 250 is controlled by the switch 249 and is connected through the resistances 215 and 216 to the opposite sides of the printing lights. The other branch 251 is controlled by the automatic switches operated when the films are too far out of registration, by a normally closed control switch 252 operable to break the circuit when occasion arises, and by a switch 254 which may be closed to energize the magnet 246. On closure of the switch 248 the switch 254 is shunted. Switch 247 closes a circuit from an A. C. source of current 255 through a motor M which drives the printer mechanism. Leads 257 and 258 from the source of current 255 supply current to the light changing solenoids 217 and 218 and to the notching solenoids 275, a double-pole double-throw manually operated switch 260 determining whether the light change or notching solenoids shall be energized. The film controlled switches 219 and 220 respectively control the solenoids individual to their respective films. When the machine is started up, the switch 254 is closed, which results in starting the driving motor and lighting the printing lights. The clutch 21 is then out, so that the films are not advanced. A switch 261 is connected to the clutch control 22 so that as the clutch is engaged the switch is closed. The switch 260 is thrown to bring the notching magnets into circuit and after notching is thrown to bring the light changing solenoids into circuit, the negative film strip in each case causing the pilot switches 219 and 220 to effect the requisite control of their solenoids. In the event of the films getting too far out of registration the automatic stop switches may open the circuit through the magnet 246 and the entire printer will be shut down until it is again purposely set in operation after the lack of registration is cured. Should the operator desire to stop the machine at any instant he can do so by operating the switch 252. It will thus be seen that the operation of the machine is entirely automatically controlled after it is once started and that it may at any instant be stopped immediately if necessary.

While one specific embodiment of the invention is disclosed and described herein for purposes of illustration, it will be evident that numerous variations in construction, materials and arrangement of parts may be made within the scope of the invention as set forth in the following claims.

Owing to the fact that the housing 101, containing the positive film feeding mechanism, is pivoted to swing into and out of threading position about the axis of the drive shaft 104, the negative film feeding mechanism in the main casing and the positive film feeding mechanism are maintained in predetermined timed relationship during the swinging movement of the housing 101 to threading position and back again to normal position.

The negative film feeding means is described in the claims as "multiple-speed" in contradistinction to the single step feed of the positives.

I claim:

1. The method of making complemental cinematographic films which comprises feeding a plurality of positive films along laterally offset paths in which surfaces of said films are parallel to a common plane, feeding a single negative film in a path in which it moves parallel to said first mentioned paths but in different directions in the respective paths, and concomitantly forming complemental series of images on the positive films in said first paths.

2. The method of printing from a multiplex cinematographic negative film bearing plural series of complemental images upon different positive films, which comprises intermittently feeding the positive films parallel with each other at a predetermined rate, intermittently feeding the multiplex negative film at a multiple of said rate successively in parallelism with the parallel portions of said positive films in the same direction as one positive film and in the opposite direction to the other, and concomitantly printing the complemental series on the different films respectively.

3. The method of printing from a multiplex film having complemental images in reversed relation to each other which comprises feeding parallel positive films in the same direction, successively feeding the multiplex negative film in printing relation to said positive films with the printing images oriented in the same direction, and concomitantly printing the complemental images on said positive films respectively.

4. The method of making complemental cinematographic films which comprises the step of concomitantly printing complemental series of images on separate films respectively from one film having a plurality of complemental series and moving at the printing spaces in the same direction as one of said first mentioned films and in the opposite direction to the other, said first mentioned films traveling in the same directions at said printing spaces.

5. The method of making complemental cinematographic films which comprises the step of concomitantly printing complemental series of images on separate positive films moving in parallel laterally offset paths respectively from a single negative film bearing a plurality of complemental series and having portions parallel to said paths, the relative directions of motion of the positive and negative films in said parallel paths being respectively opposite in the different paths.

6. In a cinematographic apparatus, a plurality of light windows arranged side by side, means for feeding separate positive film strips past said light windows in parallel laterally offset paths including positive film feeding means at the same side of a line passing through both light windows, and separate negative film feeding means arranged at opposite sides of said line.

7. In a cinematographic apparatus a plurality of light windows arranged side by side, means for feeding separate positive film strips past said light windows in parallel laterally offset paths including step-by-step positive film feeding means at the same side of a line passing through both light windows and separate step-by-step negative film feeding means arranged at opposite sides of said line.

8. In a cinematographic apparatus a plurality of light windows arranged side by side, means for feeding separate positive film strips past said light windows in parallel laterally offset paths including positive film feeding means at the same side of a line passing through both light windows and separate negative film feeding means arranged at opposite sides of said line, the rate of feed of said negative film feeding means being a multiple of that of the positive film feeding means.

9. In a cinematographic apparatus a plurality of light windows arranged side by side, means for feeding separate positive film strips past said light windows in parallel laterally offset paths including step-by-step positive film feeding means at the same side of a line passing through both light windows and separate step-by-step negative film feeding means arranged at opposite sides of said line, the rate of feed of said negative film feeding means being twice that of the positive film feeding means.

10. In a cinematographic apparatus, a plurality of light windows arranged side by side, means for feeding separate positive film strips past said light windows in parallel laterally offset paths including positive film feeding means for each window at the same side of a line passing through both light windows and at equal distances from their windows respectively, and separate negative film feeding means arranged at opposite sides of said line and at equal distances from their light windows respectively.

11. In a cinematographic apparatus, a plurality of light windows arranged side by side, means for feeding separate positive film strips past said light windows in parallel laterally offset paths including step-by-step positive film feeding means at the same side of a line passing through both light windows and at equal distances from their light windows respectively, and separate step-by-step negative film feeding means arranged at opposite sides of said line and at equal distances from their light windows respectively.

12. In a cinematographic apparatus, a plurality of light windows arranged side by side, means for feeding separate positive film strips in the same direction past said windows, and means for feeding negative film past said windows in opposite directions.

13. In a cinematographic apparatus, a plurality of light windows arranged side by side, means for feeding separate positive film strips in the same direction past said windows, and means for feeding negative film past said windows in opposite directions, and at twice the speeds of said positive film strips.

14. In a cinematographic apparatus, a plurality of light windows arranged side by side, means for feeding a separate positive film strip past each window, and means associated with each window for feeding negative film past such window, the positive and negative feeds associated with one of said windows serving to move both the positive and negative films in the same direction, and the positive and negative feeds associated with the other of said windows moving the other positive and the negative films in opposite directions.

15. In a cinematographic apparatus a plurality of light windows, means for feeding a single negative film strip in relatively opposite directions past said windows, and means for feeding separate positive film strips in the same direction past said windows whereby one positive film is movable past one window in the same direction as the negative and a second positive film is movable past another window in the opposite direction from the negative.

16. In a cinematographic apparatus, a plurality of light windows, means for feeding a single negative film strip in relatively opposite directions past said windows, including separate negative film feeding means arranged at opposite sides of a straight line passing through both of said windows, and means for feeding separate positive film strips in the same direction past said windows, whereby one positive film is movable past one window in the same direction as the negative and a second positive film is movable past another window in the opposite direction from the negative.

17. In cinematographic apparatus, a plurality of light windows, means for feeding a single negative film strip in relatively opposite directions past said windows, and means for feeding separate positive film strips in the same direction past said windows, said last-named means including simultaneously actuated film strip engaging means cooperating with said positive film strip, whereby one positive film is movable past one window in the same direction as the negative and a second positive film is movable past another window in the opposite direction from the negative.

18. In a cinematographic apparatus, a plurality of light windows, means for feeding a single negative film strip in relatively opposite directions past said windows, including separate negative film feeding means arranged at opposite sides of a straight line passing through both of said windows, and means for feeding separate positive film strips in the same direction past said windows, said last-named means including simultaneously actuated film strip engaging means cooperating with said positive film strip, whereby one positive film is movable past one window in the same direction as the negative and a second positive film is movable past another window in the opposite direction from the negative.

19. In a cinematographic apparatus, a plurality of light windows, means for feeding a single negative film strip in relatively opposite directions past said windows, and means for feeding separate positive film strips in the same direction past said windows, said negative film strip feeding means being operative to produce feed at twice the rate of said positive film feeding means, whereby one positive film is movable past one window in the same direction as the negative and a second positive film is movable past another window in the opposite direction from the negative.

20. In a cinematographic apparatus, a plurality of light windows, means for feeding a single negative film strip in relatively opposite directions past said windows, including separate negative film feeding means arranged at opposite sides of a straight line passing through both of said windows, and means for feeding separate positive film strips in the same direction past said windows, said negative film strip feeding means being operative to produce feed at twice the rate of said positive film feeding means, whereby one positive film is movable past one window in the same direction as the negative and a second positive film is movable past another window in the opposite direction from the negative.

21. In a cinematographic apparatus, a plurality of light windows, means for feeding a single negative film strip in relatively opposite directions past said windows, and means for feeding separate positive film strips in the same direction past said windows, said last-named means including simultaneously actuated film strip engaging means cooperating with said positive film strips, said negative film strip feeding means being operative to produce feed at twice the rate of said positive film feeding means, whereby one positive film is movable past one window in the same direction as the negative and a second positive film is movable past another window in the opposite direction from the negative.

22. In a cinematographic apparatus, a plurality of light windows, means for feeding a single negative film strip in relatively opposite directions past said windows, including separate negative film feeding means arranged at opposite sides of a straight line passing through both of said windows, and means for feeding separate positive film strips in the same direction past said windows, said last-named means including simultaneously actuated film strip engaging means cooperating with said positive film strips, said negative film strip feeding means being operative to produce feed at twice the rate of said positive film feeding means, whereby one positive film is movable past one window in the same direction as the negative and a second positive film is movable past another window in the opposite direction from the negative.

23. In a cinematographic apparatus, a light window, means for feeding a positive film strip past said window including film engaging elements movable in paths substantially parallel to the plane of said film advance past said window, and multiple-feed means for feeding a negative film strip in an opposite direction past said window including film engaging elements movable in paths substantially parallel to the plane of said negative strip at the opposite side of said window from the positive film feeding means.

24. In a cinematographic apparatus, a light window, means for feeding a positive film strip past said window including film engaging elements movable in paths substantially parallel to the plane of said film advance past said window, and means for feeding a negative film strip in an opposite direction and at twice the rate past said window including film engaging elements movable in paths substantially parallel to the plane of said negative strip at the opposite side of said window from the positive film feeding means.

25. In a cinematographic apparatus, a casing carrying film feed actuating mechanism and having a light window therein, a film feeding unit supported on said casing in spaced relation thereto and movable relative thereto, and operative connections between said actuating mechanism and said feeding unit permitting relative movement therebetween.

26. In a cinematographic apparatus, a casing provided with a light window, means for feeding positive and negative film strips past said light window, and a unit including automatic means for registering both film strips opposite the light window, said unit being movable away from said light window.

27. In a cinematographic apparatus, a casing provided with a light window, and means for feeding positive and negative film strips past said light window and registering them opposite the same including supporting means for a portion of said feeding means permitting bodily movement thereof away from said light window.

28. In a cinematographic apparatus, a casing provided with a light window, and means for feeding positive and negative film strips past said light window and registering them opposite the same including supporting means for the registering means and for a portion of said feeding means permitting their bodily movement away from said light window.

29. In a cinematographic apparatus, a casing provided with a light window, and means for feeding positive and negative film strips past said light window and registering them opposite the same including supporting means for the registering means and for a portion of said feeding means permitting their simultaneous bodily movement away from said light window.

30. Cinematographic apparatus comprising a film gate arranged to pass two films in contact, film feeding mechanism individual to each film, common means for driving said mechanism, and means for moving one mechanism from the other mechanism without disconnecting the driving means, whereby the two mechanisms may be maintained in predetermined timed relationship during said movement.

31. In a cinematographic apparatus, a light window, means for feeding a negative film strip past said window, and means for feeding a positive strip past said window, both of said means being arranged to be positively driven by power from a common source, whereby the rates of feed may be timed one with the other, the positive film feeding means being pivotally mounted upon a shaft through which power is transmitted thereto, whereby it may be moved toward and away from said window about its pivot without interfering with the timing of the film feeding means.

32. In a cinematographic apparatus, a casing provided with a light window, a film gate pivotally attached to said casing adjacent to said window, means within the casing for feeding the negative film past said window, and means in said film gate timed with the negative film feeding means for feeding a positive film past said window.

33. In a cinematographic apparatus, a casing provided with a light window, a film gate pivotally attached to said casing adjacent to said window, step by step feeding means within the casing for moving the negative film past said window, and step by step means in said film gate timed with the negative film feeding means for moving a positive film past said light window.

34. In a cinematographic apparatus, a casing provided with a plurality of light windows, means in the casing for feeding a negative film successively past said light wndows, a film gate cooperating with all said windows, and separate means in said film gate adjacent to each of said windows for simultaneously feeding a separate positive film past each window.

35. In a cinematographic apparatus, a casing provided with a plurality of light windows, means in the casing for feeding a negative film successively past said light windows, a film gate cooperating with all said windows, and separate means in said film gate adjacent to each of said windows for simultaneously feeding a separate positive film past each window, the film gate being pivotally connected to said casing by a shaft through which power is transmitted to the positive film feeding means, whereby the positive and negative film feeding means may be timed with respect to each other independently of the position of the film gate.

36. In a cinematographic apparatus, a casing provided with a light window, a film gate pivotally attached to said casing adjacent to said window, means within the casing for feeding a negative film past said window, means including the pivot between said film gate and said casing for transmitting power from the negative film feeding means to the film gate, means within said film gate for feeding a positive film, said last-named means adapted to be driven by said power transmitting means in timed relationship to said negative film feeding means, and means in the film gate actuated by the power transmitting means for registering the films with respect to each other and with respect to said light window.

37. In a cinematographic apparatus, a casing provided with a light window, a film gate pivotally attached to said casing adjacent to said window, means within the casing for feeding a negative film past said window, means including the pivot between said film gate and said casing for transmitting power from the negative film feeding means to the film gate, a positive film feeding means in said film gate adapted to be driven by said power transmitting means in timed relationship to said negative film feeding means, means in the film gate for registering the films with respect to each other and said light window, and means in the film gate for stopping the entire apparatus if the films are out of registry, both last-named means being actuated by said power transmitting means.

38. In a cinematographic apparatus, a plurality of light windows, means for feeding a negative film successively past said light windows, means for feeding a separate positive film past each of said light windows, and means responsive to the negative film for cutting a notch in each of the positive films in a corresponding position, whereby the positive films may be combined in correct registered relationship.

39. In a cinematographic apparatus, a casing having a pair of light windows, step by step means for feeding a negative film strip having complementary pairs of images successively past said windows, two image spaces at each step whereby each step of the feed may bring one image of one pair in coincidence with one window and the other image of another pair in coincidence with the other window, means for feeding a separate positive film strip past each of said windows, and means responsive to the negative film for cutting a notch in each of the positive films in a corresponding position, whereby the positive films may be combined in correct registered relationship.

Signed by me at Brooklyn, New York, this 21st day of May, 1925.

HERBERT O. CARLETON.